(12) United States Patent
Sichman

(10) Patent No.: US 10,662,922 B2
(45) Date of Patent: May 26, 2020

(54) METHOD FOR EFFICIENTLY OBTAINING MECHANICAL WORK AND/OR GENERATING POWER FROM FLUID FLOWS AND APPARATUS THEREOF

(71) Applicant: Martin Sichman, Bratislava (SK)

(72) Inventor: Martin Sichman, Bratislava (SK)

(73) Assignee: Archee, s.r.o., Pezinok (SK)

( * ) Notice: Subject to any disclaimer, the term of this patent is extended or adjusted under 35 U.S.C. 154(b) by 0 days.

(21) Appl. No.: 15/774,741

(22) PCT Filed: Nov. 9, 2016

(86) PCT No.: PCT/SK2016/060004
§ 371 (c)(1),
(2) Date: May 9, 2018

(87) PCT Pub. No.: WO2017/082832
PCT Pub. Date: May 18, 2017

(65) Prior Publication Data
US 2018/0328337 A1    Nov. 15, 2018

(30) Foreign Application Priority Data
Nov. 10, 2015  (SK) .................................. 50075-2015

(51) Int. Cl.
*F03D 5/06*       (2006.01)
*F03B 17/06*     (2006.01)
*F03B 15/00*     (2006.01)

(52) U.S. Cl.
CPC ................ *F03D 5/06* (2013.01); *F03B 15/00* (2013.01); *F03B 17/06* (2013.01);
(Continued)

(58) Field of Classification Search
CPC .. F03D 5/06; F03D 5/005; F03B 15/00; F03B 17/06
(Continued)

(56) References Cited

U.S. PATENT DOCUMENTS 5,009,571 A * 4/1991 Smith ....................... F03D 5/06
                                                                  416/79
6,652,232 B2 * 11/2003 Bolduc ................... F03B 17/06
                                                                  416/24
(Continued)

*Primary Examiner* — Viet P Nguyen
(74) *Attorney, Agent, or Firm* — Patshegen IP LLC; Moshe Pinchas

(57) ABSTRACT

The invention describes a method for more efficient way of obtaining mechanical work and/or power generation from fluid flows with the oscillating motion of the blade and the counterweight in a direction that is perpendicular to the flow of fluid in conjunction with a smooth and periodic change of the angle of the blade to the flow of fluid over the sine wave which is characterized by being carried out by: rotating the surface of the blade to the direction of the fluid's flow and/or; changing the amplitude of the oscillation of the blade with respect to the fluid's flow rate and/or; changing the amplitude of the angle of the blade with respect to the fluid's flow rate; capturing mechanical work in the form of torque or tensile/compressive force to propel attached machinery or generate power from the arm of the counterweight. The invention further describes the apparatus to carry out this method.

9 Claims, 16 Drawing Sheets

(52) U.S. Cl.
CPC . *F05B 2220/7068* (2013.01); *F05B 2240/142* (2013.01); *F05B 2240/931* (2013.01); *F05B 2270/20* (2013.01); *F05B 2270/602* (2013.01); *Y02E 10/226* (2013.01); *Y02E 10/28* (2013.01); *Y02E 10/70* (2013.01); *Y02E 10/725* (2013.01); *Y02T 70/5254* (2013.01)

(58) Field of Classification Search
USPC ........................................ 290/43, 44, 54, 55
See application file for complete search history.

(56) References Cited

U.S. PATENT DOCUMENTS

| | | | | |
|---|---|---|---|---|
| 8,110,937 B2 * | 2/2012 | Finnigan | ............... | F03B 13/182 290/42 |
| 8,469,663 B2 * | 6/2013 | Kerr | ............... | F03B 17/062 416/1 |
| 8,497,595 B1 * | 7/2013 | Petner | ............... | F03D 5/06 290/55 |
| 8,657,575 B2 * | 2/2014 | Morris | ............... | F03B 17/06 416/79 |
| 8,860,240 B2 * | 10/2014 | Lovas | ............... | F03D 5/06 290/44 |
| 9,006,919 B2 * | 4/2015 | Lynch | ............... | F03B 17/06 290/54 |
| 9,541,056 B2 * | 1/2017 | Wigant | ............... | H02K 7/1807 |
| 9,835,130 B1 * | 12/2017 | McKinley | ............... | F03B 17/06 |
| 2009/0218822 A1 * | 9/2009 | Rink | ............... | F03B 13/264 290/54 |
| 2009/0224553 A1 * | 9/2009 | Williams | ............... | F03D 5/06 290/55 |
| 2012/0187694 A1 * | 7/2012 | Engervik | ............... | F03B 17/06 290/54 |
| 2012/0251339 A1 * | 10/2012 | Goris | ............... | B63H 1/36 417/53 |
| 2013/0099502 A1 * | 4/2013 | Roberts | ............... | F03B 13/08 290/54 |
| 2013/0200628 A1 * | 8/2013 | Kane | ............... | F03B 17/062 290/54 |

* cited by examiner

METHOD FOR EFFICIENTLY OBTAINING MECHANICAL WORK AND/OR GENERATING POWER FROM FLUID FLOWS AND APPARATUS THEREOF

FIELD OF INVENTION

The invention relates to a more efficient way of obtaining mechanical work and/or power generation. The invention also relates to the design of an apparatus that efficiently uses the energy of fluid flows to perform mechanical work and/or to generate power. The aim of the invention is to maximize the utilization of the energy potential of fluid flows, such as wind and water. The invention falls within the power industry.

DESCRIPTION OF PRIOR ART

There are several known principles and apparatuses for generating power from fluid flows. These are well-known wind power stations and hydropower plants with the classic designs of rotating blades of wind turbines and water turbine blades radially arranged on the rotor.

There are also unconventional designs, such as the wind-driven device from US Document U.S. Pat. No. 4,595,336. It is a device that captures energy from flowing fluids by means of a set of two wings performing an oscillating and reciprocating motion. The angle of attack of the wings is derived from the reciprocating motion of the arm to which they are attached. Adjustments to the angle of attack may be performed using the mechanical parts connected to the arm. The axes of the wings remain parallel to the axis of the reciprocating motion throughout the motion cycle. This solution does not allow protection against weather conditions by placing the mechanical parts outside the flowing fluid.

Then, there is an apparatus for extraction of energy from flowing fluids based on U.S. Pat. No. 6,273,680 B1. It is a device that captures energy from flowing fluids by means of a set of several foils performing a linear reciprocating motion. The angle of attack of the foils is derived from the rods they are mounted on. Adjustments to the angle of attack may be performed using the mechanical parts connected to the rods. The axes of the foils remain perpendicular to direction of the reciprocating motion throughout the motion cycle. The device requires a high number of fine mechanical parts and extensive support structure.

U.S. Pat. No. 6,652,232 B2 introduces a self-trimming oscillating wing system. It is a device that captures energy from flowing fluids by means of a wing performing an oscillating and reciprocating motion. The angle of attack of the wing is derived from the arm to which it is attached. Adjustments to the angle of attack may be performed using the mechanical parts connected to the arm. The axis of the wing remains parallel to the axis of the reciprocating motion throughout the motion cycle. The solution does not allow protection against weather conditions by placing the mechanical parts outside the flowing fluid.

Finally, the Master's Thesis: Windstem, Remko Gerbenzon B.Sc., Delft Technical University, 2007, describes a feasibility study of a single blade wind turbine oscillating on a vertical plane. The axis of the blade is mounted onto the ground via a joint connection. There is a counterweight to offset the weight of the blade mounted to the axis of the blade under the pivot joint. The angle of attack of the wing is derived from the reciprocating motion of the blade. Changes to the angle of attack take place in the outermost positions, together with the change of direction of the blade's motion by springs. Except for the outermost positions, the wing moves on its trajectory at a constant speed. The springs store the kinetic energy of the blade and subsequently transfer it back to the blade in the opposite direction. Changes to the angle of attack take place only in the outermost positions by means of a mechanical device. Capturing energy from the system takes place, for example, by linear generators coupled to the springs on the blade's arm. Capturing energy and changing the angle of attack in the outermost positions have several disadvantages that are also mentioned by the author of the thesis. The kinetic energy of the blade's arm in its outermost position is significant; therefore, its storage requires massive springs and thus material costs are increased. When capturing energy, the springs lean on the blade's arm causing a substantial bending moment therein. The arm of the blade must be extremely strong, which is costly, too. It is very inefficient to capture energy from linear motion and transform it to e.g. electricity. Electricity is obtained from the device in the form of pulses generated in the outermost positions of the blade and its direct utilization is difficult. The device causes significant shocks in the outermost positions, which are disruptive to the environment and strain the mechanical parts of the device.

The above-mentioned disadvantages of power generation by wind power plants with regard to eliminating noise, reducing establishment costs and increasing energy efficiency have paved the way for the development of a more efficient way of using wind energy and also the energy of flowing water, and for the construction of the present apparatus, particularly to intensify power generation and work performance.

As described below, this effort has resulted in a more efficient way of obtaining mechanical work and/or generating electric power from fluid flows and apparatus for more efficient obtaining of mechanical work and/or electric power generation from fluid flows in the present invention.

SUMMARY OF THE INVENTION

The above drawbacks are eliminated by a more efficient way of obtaining mechanical work and/or generating electric power from fluid flows according to the present invention with the oscillating motion of a blade and a counterweight in the direction that is perpendicular to the flow of fluid in conjunction with a smooth and periodic change of the angle of the blade to the flow of fluid over the sine wave which is in principle carried out by:
  rotating the surface of the blade rotation boundaries to the direction of the fluid's flow and/or;
  changing the amplitude of the oscillation of the blade with respect to the fluid's flow rate and/or;
  changing the amplitude of the angle of the blade with respect to the fluid's flow rate;
  capturing mechanical work in the form of torque or tensile/compressive force to propel attached machinery or generate power from the arm of the counterweight.

The above-mentioned more efficient way of obtaining mechanical work and/or generating power from fluid flows according to this invention has resulted in designing an apparatus for more efficient obtaining of mechanical work and/or power generation from fluid flows based on a pendular arrangement of the blade and the counterweight pivoting on a pivot joint. The essence of the invention lies in the fact that the pivot joint of a vertical blade with a symmetrical aerodynamic profile is coupled with a counterbalance of a slightly higher weight than the blade via the arm of the counterweight while the arm of the counterweight is coupled with at least two mechanisms belonging to the system of the following control mechanisms:

There is a mechanism with an integrated flywheel, the first articulated mounting, the first rod and the first pivot joint to capture torque or tensile/compressive force. An electric generator or machinery is connected to the flywheel. A variety of magnets with varying polarities are mounted onto the perimeter of the disc of the electric generator. There are static coils positioned in the magnetic field of these magnets.

Furthermore, there is a mechanism that contains the second articulated mounting, the second rod, the second pivot joint and an angle lever for smooth and periodic variations in the alpha angle between 0° and max.±90° of the blade throughout the oscillation to the direction of the flow of fluid.

Furthermore, there is a mechanism for the smooth rotation of the surface of the blade rotation boundaries to the direction of the fluid's flow containing a length-adjustable member that is placed in the second rod. This length-adjustable member may be the fourth linear actuator.

Then, there is a mechanism for changing the amplitude of the blade with respect to the rate of the fluid's flow, either with the first linear actuator attached to the first articulated mounting or with the second linear actuator attached to the first pivot joint.

Finally, there is a mechanism for changing the amplitude of the blade's angle with respect to the rate of the fluid's flow with the third linear actuator attached to the second articulated mounting or with the fifth linear actuator attached to the angle lever.

The apparatus for more efficient obtaining of mechanical work and/or for power generation from fluid flows may be put into practice as a modification of a wind turbine, wherein the blade is located above the counterweight and the pivot joint of the blade is located above the center of gravity, while the oscillation of the blade from the vertical is at the beta angle between 0° and ±90° of the oscillation.

An alternative to the wind turbine modification is to locate the pivot joint of the blade in the center of gravity, while the oscillation of the blade from the horizontal is at the beta angle between 0° and max.±90° of the oscillation.

The apparatus for more efficient obtaining of mechanical work and/or power generation from fluid flows may be put into practice as a modification of a water turbine, wherein the blade is located under the counterweight and the pivot joint of the blade is located above the center of gravity, while the oscillation of the blade from the vertical is at the beta angle between 0° and max.±90° of the oscillation.

The apparatus for more efficient obtaining of mechanical work and/or power generation from fluid flows is, advantageously, a modular container apparatus in which the pivot joint of the blade, counterweight, flywheel and at least two mechanisms belonging to the system of control mechanisms, including the mechanism for capturing torque or tensile/compressive force, the mechanism for smooth and periodic variations in the alpha angle of the blade during the entire oscillation to the direction of the fluid's flow, the mechanism for the smooth rotation of the surface of the blade to the direction of the fluid's flow, the first and second mechanism for changing the amplitude of the oscillation of the blade with respect to the rate of the fluid's flow or the first and second mechanism for changing the amplitude angle of the blade with respect to the rate of the fluid's flow, are integrated in the container located on the surface or below the surface of the ground or mounted on a ship or in a building. The turbine can be mounted at the bottom of the stream of liquid (water stream, tides, etc.), or on a float (a boat anchored in the river stream, etc.). In one of the embodiments, the pivot joint of the blade and the counterweight are integrated in an attached auxiliary expanding container.

In one modification, according to the invention, the apparatus for more efficient obtaining of mechanical work and/or power generation from fluid flows is put into practice in such a way that the blades are in a multiple linear line-up, while at least two mechanisms of the same kind belonging to the system of control mechanisms, including the mechanism for capturing torque or tensile/compressive force, the mechanism for smooth and periodic variations in the alpha angle of the blade during the entire oscillation to the direction of the fluid's flow, the mechanism for the smooth rotation of the surface of the blade to the direction of the fluid's flow, the first and second mechanism for changing the amplitude of the oscillation of the blade with respect to the rate of the fluid's flow or the first and second mechanism for changing the amplitude angle of the blade with respect to the rate of the fluid's flow, are coupled together or are mutually independent. If the blades are coupled together, then they all move in the same phase. If the blades are independent, then they all move in different phases.

In other embodiments, according to the invention, the apparatus for more efficient obtaining of mechanical work and/or power generation from fluid flows is put into practice in such a way that the blades are in a multiple radial line-up, while at least two mechanisms of the same kind belonging to the system of control mechanisms, including the mechanism for capturing torque or tensile/compressive force, the mechanism for smooth and periodic variations in the alpha angle of the blade during the entire oscillation to the direction of the fluid's flow, the mechanism for the smooth rotation of the surface of the blade to the direction of the fluid's flow, the first and second mechanism for changing the amplitude of the oscillation of the blade with respect to the rate of the fluid's flow or the first and second mechanism for changing the amplitude angle of the blade with respect to the rate of the fluid's flow, are coupled together or are mutually independent. If the blades are coupled together, then they all move in the same phase. If the blades are independent, then they all move in different phases.

The term "fluid" refers collectively to liquids and gases.

DETAILED DESCRIPTION OF THE INVENTION

The function of the apparatus for more efficient obtaining of mechanical work and/or generating power from fluid flows can be described as follows. In its starting position, the blade is approximately at the maximum angle of the blade and its axis is perpendicular to the ground. By flowing around the aerofoils of the blade, the wind causes forces that are not parallel to the axis of the pendular motion. As a result of these aerodynamic forces, the blade starts to move to the two outermost positions of the pendular motion. In its outermost position, the blade's angle is approximately zero, which is why the aerodynamic forces caused by the wind are approximately parallel to the axis of the pendular motion and thus do not contribute to the movement of the blade. At this stage, the movement of the blade is caused by the kinetic energy stored in the flywheel disc. After going through the two outermost positions the blade's angle increases in the opposite direction to the starting position and it is again approximately at a maximum in the starting position of the axis of the blade perpendicular to the ground. Consequently, the blade reduces the angle to approximately zero angle in both of the outermost positions. When moving towards the starting position of the blade that is perpendicular to the ground, the blade's angle rises again in the direction of the starting position. This cycle is repeated. The rotation of the flywheel disc coupled with the disc of the generator spins the generator disc. The change of the magnetic field in the coils, resulting from the alternating polarity of the magnets and the rotation of the generator's disc which the coils are attached on, generates electric current. The process of inducing the electric field in coils when changing the strength and orientation of a magnetic field is well known. In the basic solution, the flywheel is described to have a vertical axis of rotation, but it is also possible to design it with a horizontal axis, or at a different angle.

Further, adjustment options, e.g. of a wind turbine, are described. Optionally, the wind turbine can be adjusted according to the wind direction. The basic solution operates optimally when the wind direction is parallel to the axis of the pendular motion. The ability to convert the mechanical energy of the wind to the rotational motion of the generator's disc is proportional to the angle of attack, it decreases sinusoidally from the starting position of the axis of the blade toward the outermost positions of the blade. If the wind direction is non-parallel to the axis of the pendular motion, the forces caused by airflow around the blade act in the extreme positions of the blade and in the vicinity thereof and cause the rotation of the generator's disc to slow down. The described effect can be avoided by adjusting the length of the second rod. By extending or shortening the second rod it is possible to rotate the angle rather constantly throughout the cycle of the pendular motion of the blade and thus significantly improve efficiency when the wind direction is other than parallel to the axis of the pendular motion. The prolongation or shortening of the second rod may be achieved for example by a linear servomotor, hydraulic piston, pantograph or linear guiding mechanism.

A wind turbine according to the invention allows the angle of the blade to be adjusted in the vertical position. It is appropriate to use different maximum angles of the blade for different wind speeds and different speeds of rotation of the flywheel disc. It is possible to adjust the maximum angles of the blade in the starting position of the axis of the blade by changing the length of the angle lever of the blade or by changing the crank length of the second rod. The prolongation of the angle lever of the blade decreases the maximum angle of the blade, the shortening of the angle lever of the blade increases it. The prolongation of the second rod's crank increases the angle of the blade, the shortening of the second rod's crank decreases the angle. The prolongation or shortening of the angle lever of the blade and the crank of the second rod may be achieved for example by a linear servomotor, hydraulic piston, pantograph or linear guiding mechanism.

A wind turbine according to the invention allows the outermost positions of the pendular motion to be adjusted. It is appropriate to use different outermost positions of the pendular motion for different wind speeds and different speeds of rotation of the flywheel disc. It is possible to adjust the outermost positions of the pendular motion by changing the location of the pivot joint of the first rod on the axis of the blade or by changing the distance between the articulated mounting of the first rod and the axis of rotation of the flywheel. Increasing the distance between the pivot joint of the first rod and the axis of the pendular motion decreases the angle between the outermost positions of the pendular motion, decreasing the distance increases the angle. Increasing the distance between the articulated mounting of the first rod and the axis of rotation of the flywheel increases the angle between the outermost positions of the pendular motion, decreasing the distance decreases the angle.

The advantages of the more efficient way of obtaining mechanical work and/or generating power from fluid flows according to the present invention and the construction of the apparatus for more efficient obtaining of mechanical work and/or power generation from fluid flows according to the present invention are evident from its effects that are manifested externally. The effects of the present invention lie in the fact that the mechanical parts of the basic solution are accessible from the ground and do not require the use of cranes or other equipment for vertical transport of heavy objects for the installation, operation and repairs of the equipment described herein. In case of rotary turbines there is the risk of frost which gradually expands until it reaches a critical point when it break off and leaves the blade driven by gravity and centrifugal force at a possibly high speed and hence with a possible risk of damage or injury upon impact. The described solution according to the invention is on the ground level and the nature of the movement of the blade gradually shakes off the frost and thus there is no risk of high gravity acceleration or high centrifugal force. Because of the nature of the ground mounting it is structurally possible to use a much larger effective aerodynamic surface. Large aerodynamic surfaces may allow the speed of the blade's motion to be reduced, thereby reducing acoustic effects and danger for birds. The described solution enables to connect a theoretically infinite number of effective aerodynamic surfaces to a single generator. This allows to reduce the costs for maintenance, repairs and procurement. To adjust the wind direction, although within a limited angle, does not require rotation of the entire apparatus, in contrast to existing solutions known in the art. The apparatus allows the wing's speed to be changed smoothly, which reduces mechanical stress on its parts in contrast to the "windstream" system. In underground installation, the apparatus is not visible at all except for the effective aerodynamic surface requiring exposure by nature. The container-based design allows prefabrication. The presence of professional staff during installation is not necessary. The container system is easily transportable. Modularity allows for the apparatus to be supplemented with various different functions, such as a playground or a facility for refugees, etc. The blade can have different shapes for different situations. The large surface of the blade may be used for advertising. Smoother performance characteristics may be achieved by lining up several blades. The blade is repairable/replaceable from the ground. The blade can be installed at a higher place and thus people can walk safely around it (at low frequencies). At higher wind speeds, the blade can tilt in the direction of the wind, using the tilt servomotor and thereby reduce its resistance, or the blade can recline onto the ground. The large surface and thickness of the blade also allow to integrate mechanisms to change the shape of the aerodynamic profile. In the embodiment that captures energy of a flowing river, the propeller is more susceptible to damage by floating timber and it must have watertight bearings requiring lubrication. The solution according to the present invention allows the use of a collar on the axis of the blade, thereby achieving water resistance. Then, only the hydrodynamically effective parts protrude from the boat. The movement of the blade is slow, and therefore, in case of a collision with the bottom or a floating object, potential damage is smaller and the risk for aquatic fauna and flora is minimal. It is also possible to fold the blade into a transportable position, so it can be used as a rudder during the voyage.

BRIEF DESCRIPTION OF DRAWINGS

The more efficient way of obtaining mechanical work and/or generating power from fluid flows and the apparatus for more efficient obtaining of mechanical work and/or power generation from fluid flows based on the invention are further described in the specific embodiments shown in the figures.

EXAMPLES

It is evident that the individual embodiments of the more efficient way of obtaining mechanical work and/or generating power from fluid flows and corresponding apparatus according to the present invention are presented by way of illustration only and not as their restrictions. Skilled experts in the art will be able to ascertain many equivalents to the specific embodiments of the invention using no more than routine experimentation. Then even such equivalents shall fall within the scope of the following patent claims.

Skilled experts in the art shall not find it difficult to design the dimensions of the apparatus for more efficient obtaining of mechanical work and/or generating power from fluid flows and to make a suitable choice of materials and design layout, so these characteristics have not been addressed in detail.

Example 1

This example of a specific embodiment of the present invention describes a more efficient way of obtaining mechanical work and/or generating power from fluid flows, the operation of which is evident from FIGS. 1 and 2. The method uses the pendular motion of the blade and the counterweight in a direction that is perpendicular to the flow of fluid in conjunction with a smooth and periodic change of the angle of the blade to the flow of fluid over the sine wave. Furthermore, the method performs:
  the rotation of the surface of the blade rotation boundaries to the direction of the fluid's flow and/or if a change in the direction of the flow of wind or water occurs;
  changes in the amplitude of the oscillation of the blade with respect to the fluid's flow rate and/or if this does not suffice, then also
  changes in the amplitude of the angle of the blade with respect to the fluid's flow rate;

capturing mechanical work in the form of torque or tensile/compressive force to propel attached machinery or generate power from the arm of the counterweight.

Example 2

Figure 1A:
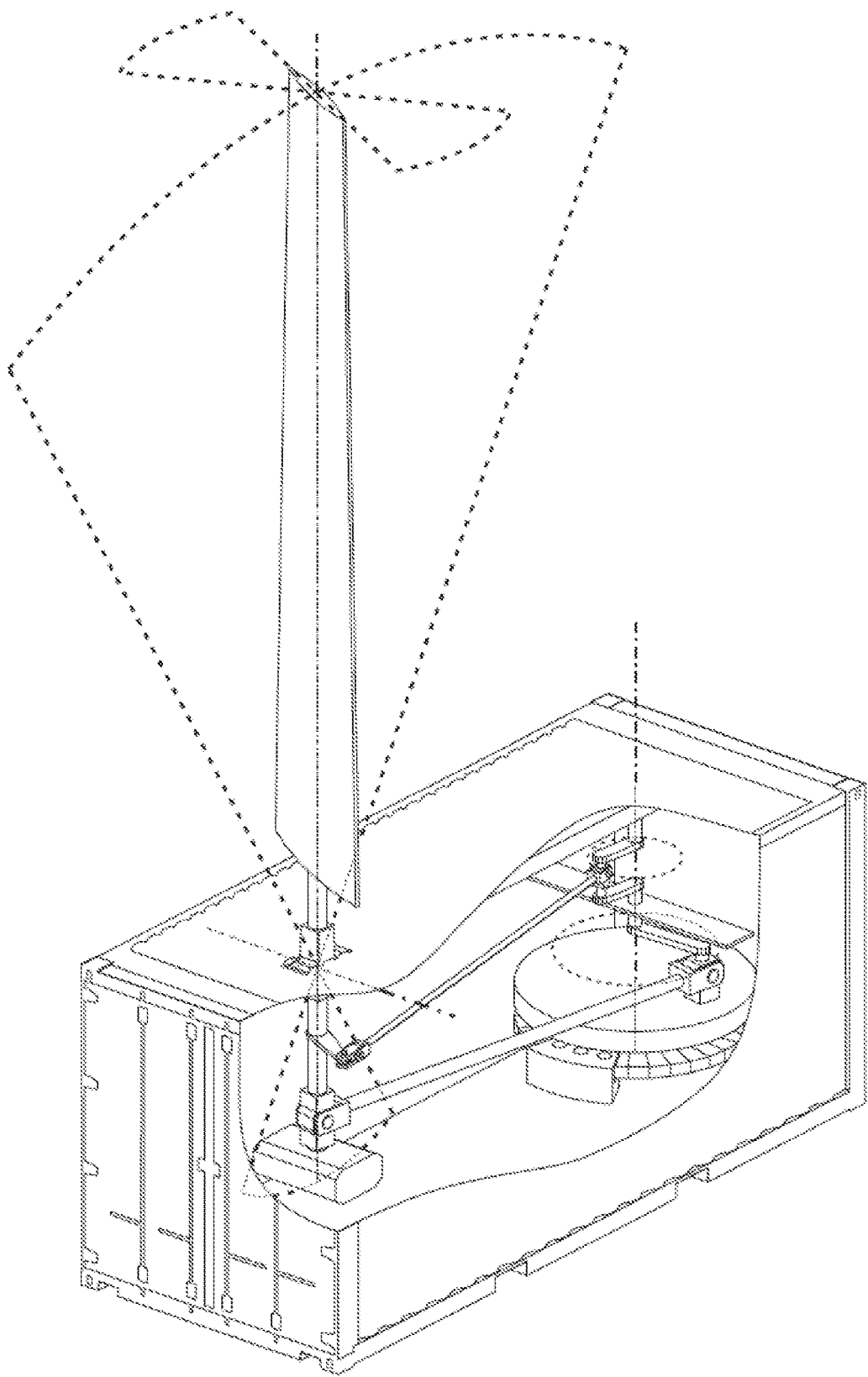
FIG. 1a illustrates the basic structural layout of a wind turbine for above-ground installations with a mechanism for capturing torque or tensile/compressive force and a mechanism for smooth and periodic variations in the alpha angle of the blade.
Figure 1B:
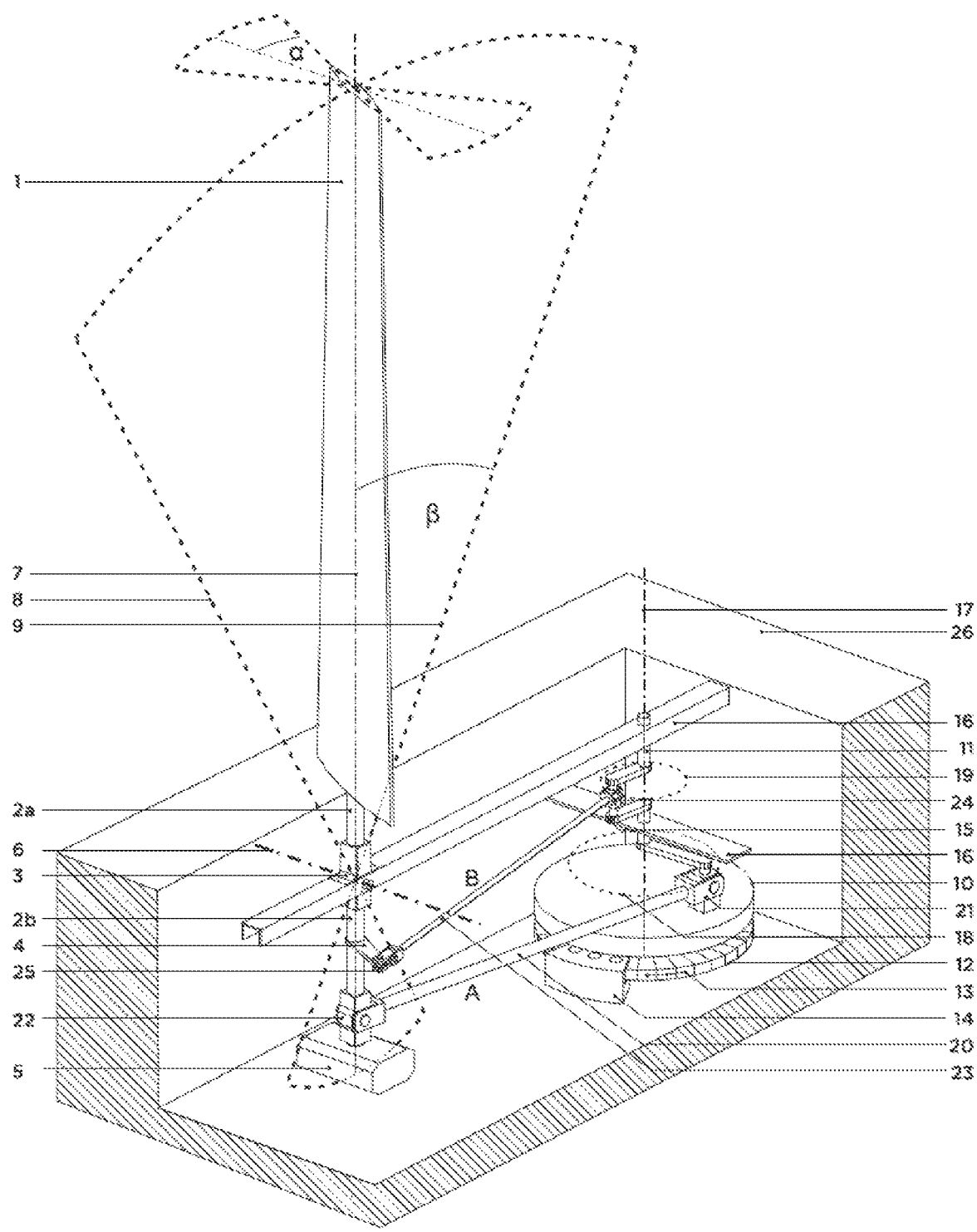
FIG. 1b illustrates the container assembly of a wind turbine for underground installation.
Figure 1C:
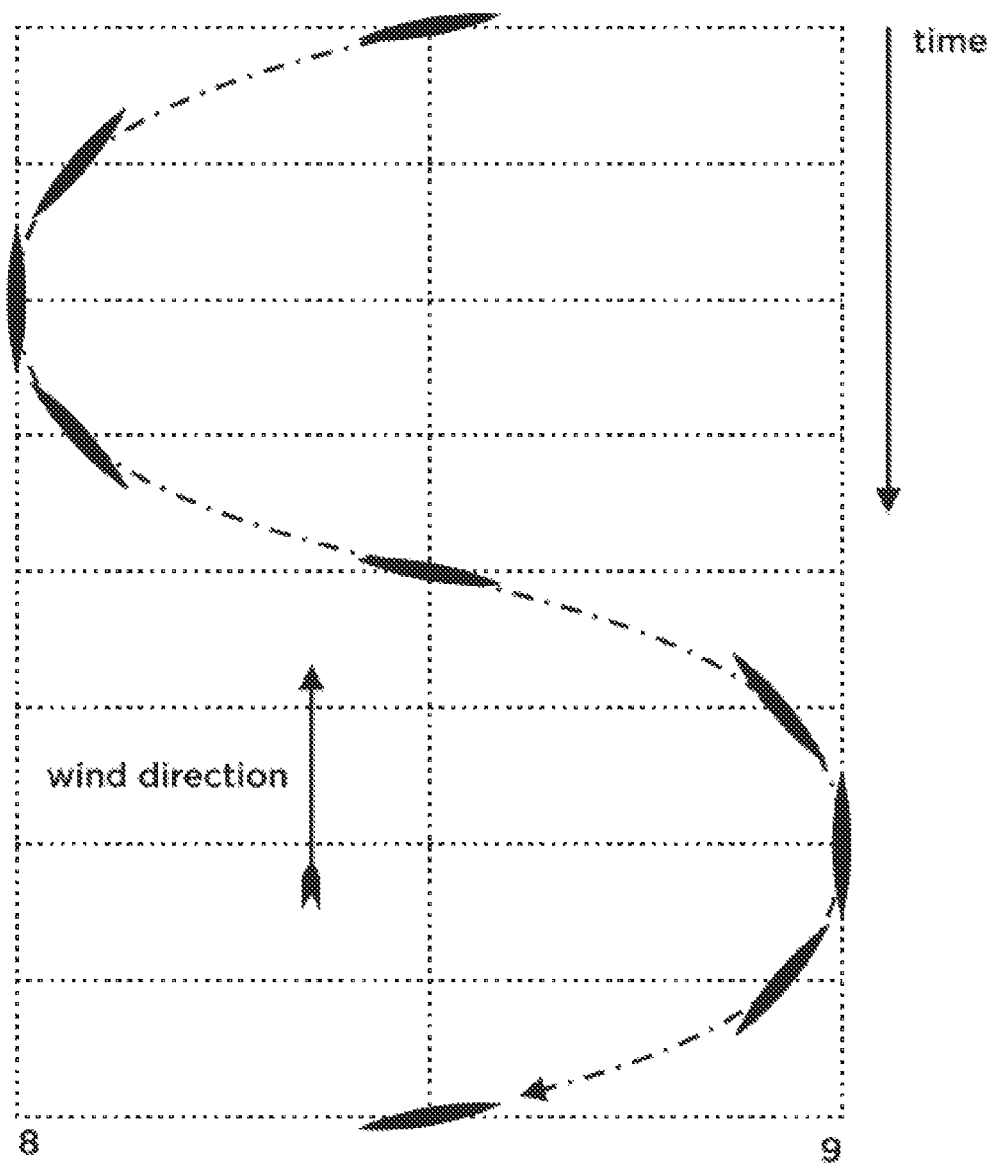
FIG. 1c shows a graph with the sine wave of the smooth change of the blade's angle.
Figure 2A:
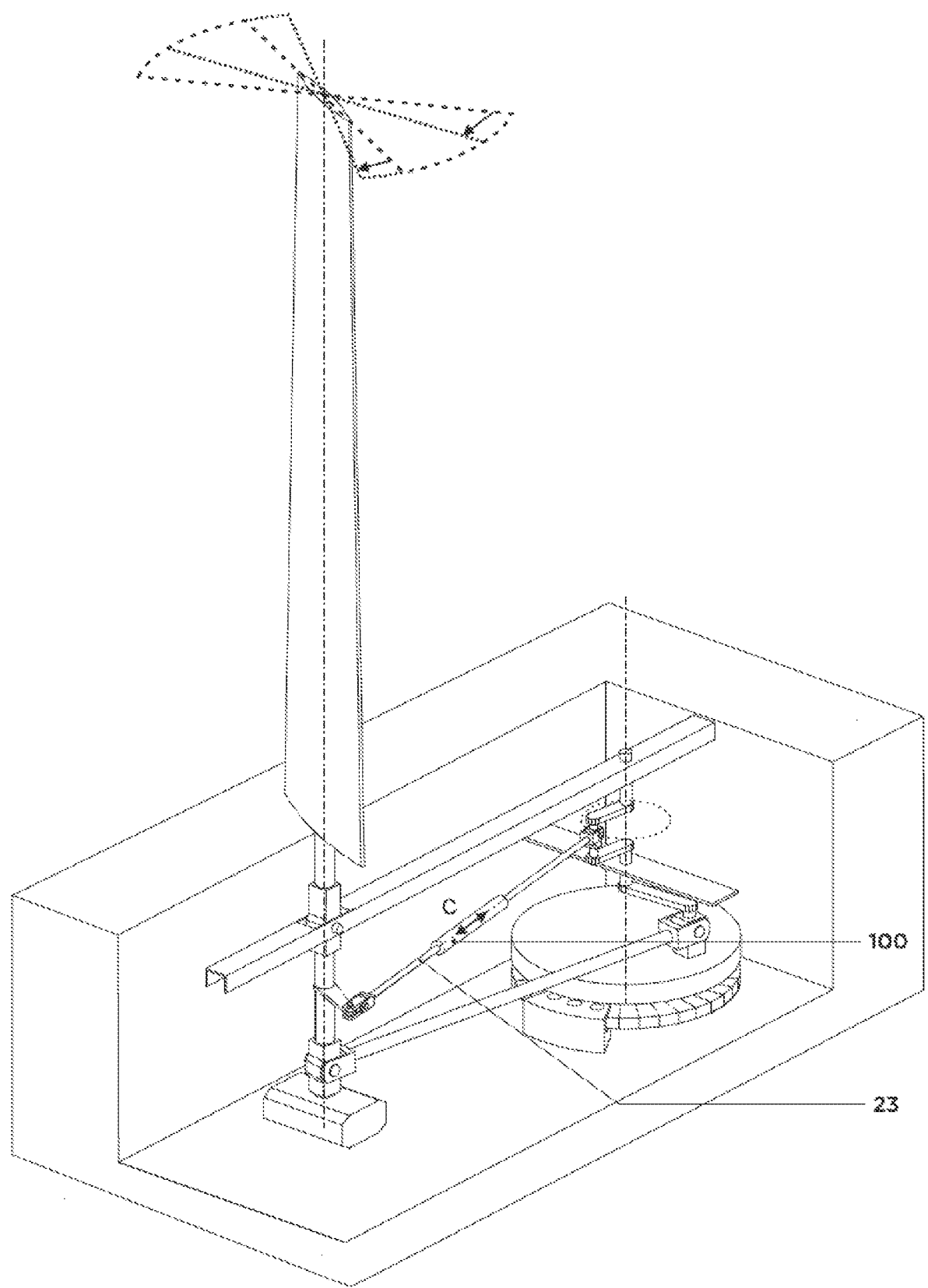
FIG. 2a illustrates the mechanism for a smooth rotation of the surface of the blade rotation boundaries to the direction of the fluid's flow.
Figure 2B:
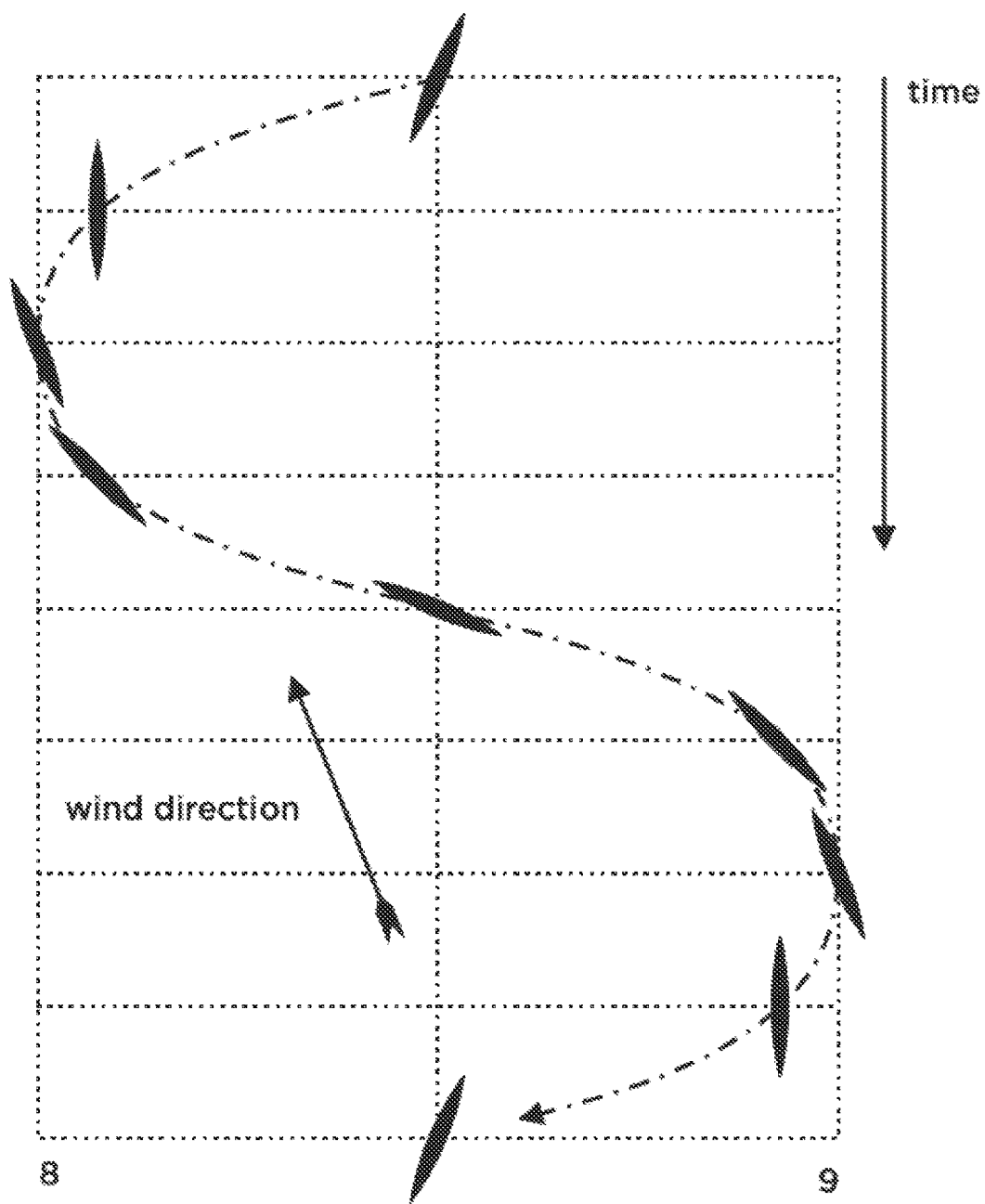
FIG. 2b shows the graph of the surface rotation of the blade to the direction of the fluid's flow.
Figure 3A:
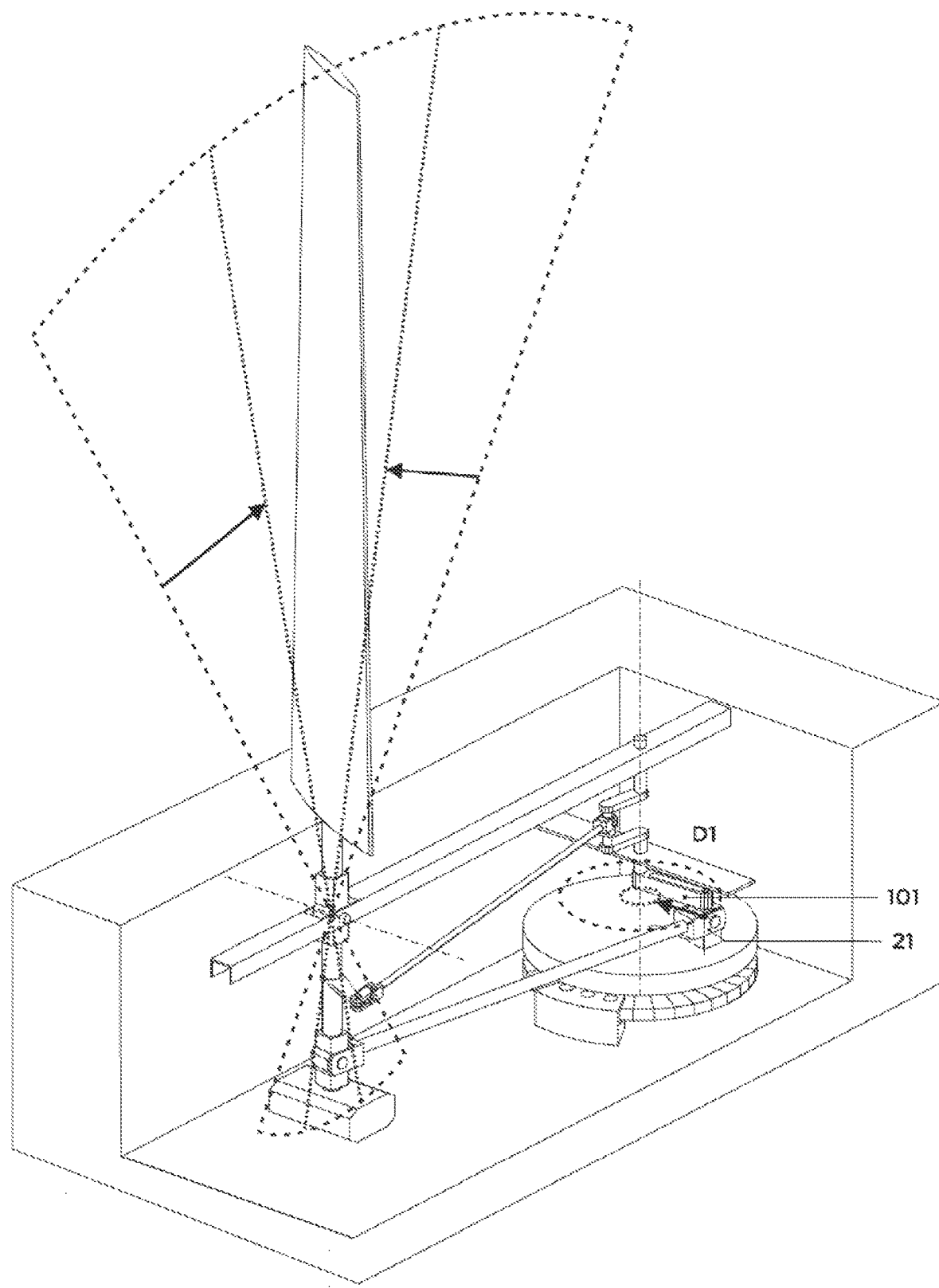
FIG. 3a illustrates the first mechanism for changing the amplitude of the oscillation of the blade with respect to the fluid's flow rate.
Figure 3B:
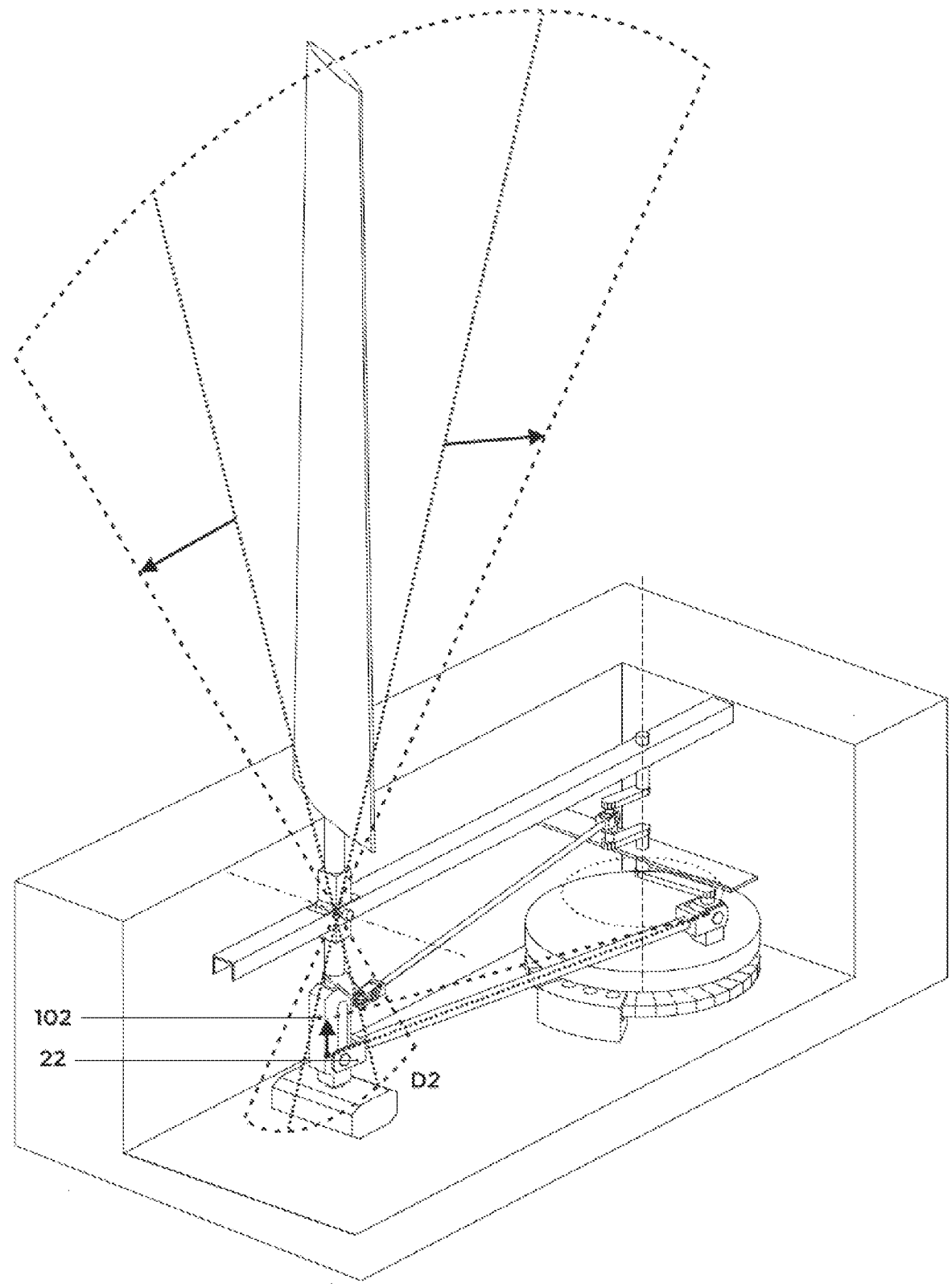
FIG. 3b illustrates the second mechanism for changing the amplitude of the oscillation of the blade with respect to the fluid's flow rate.
Figure 3C:
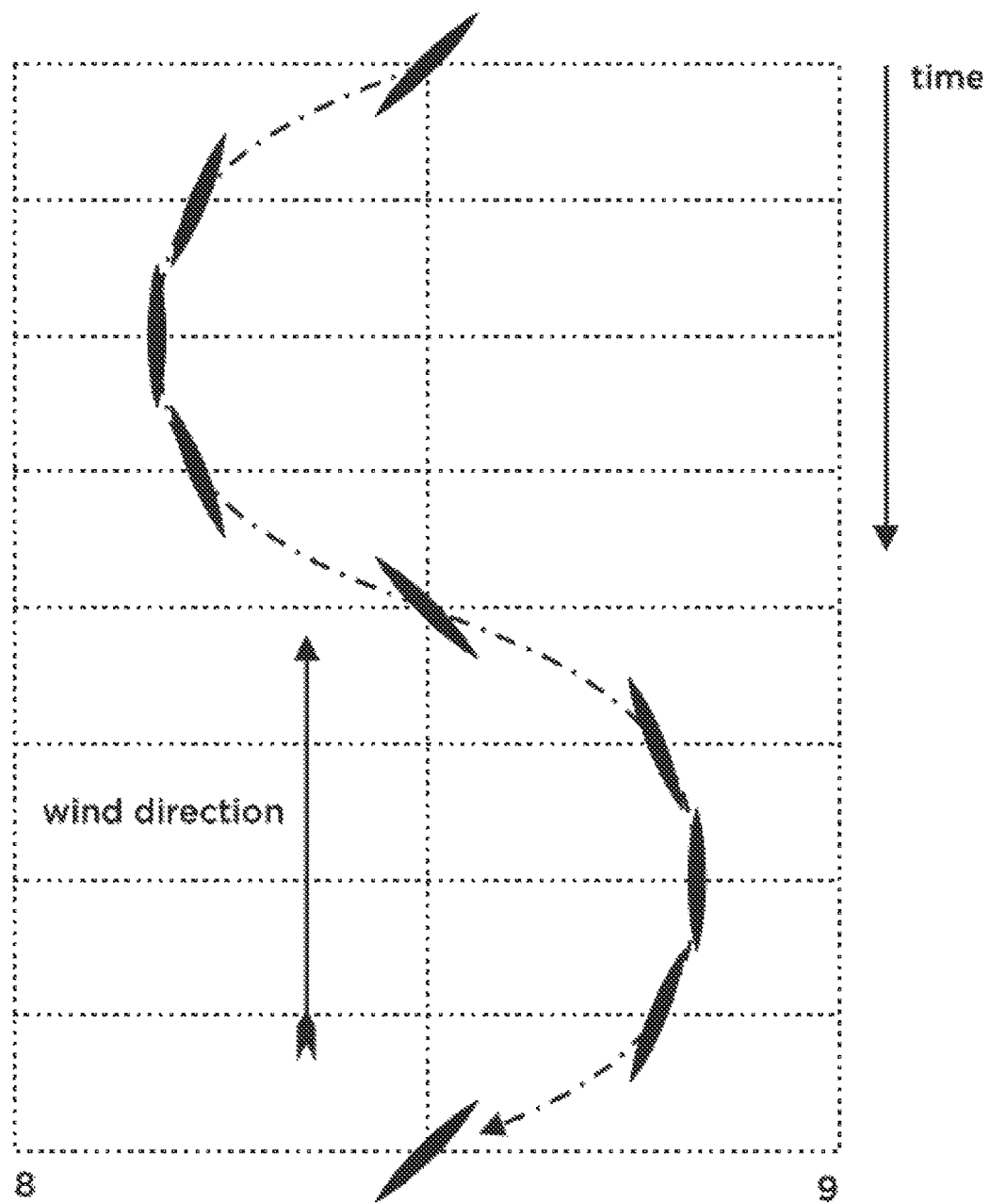
FIG. 3c shows the graph of decreasing the amplitude of the oscillation of the blade.
Figure 4A:
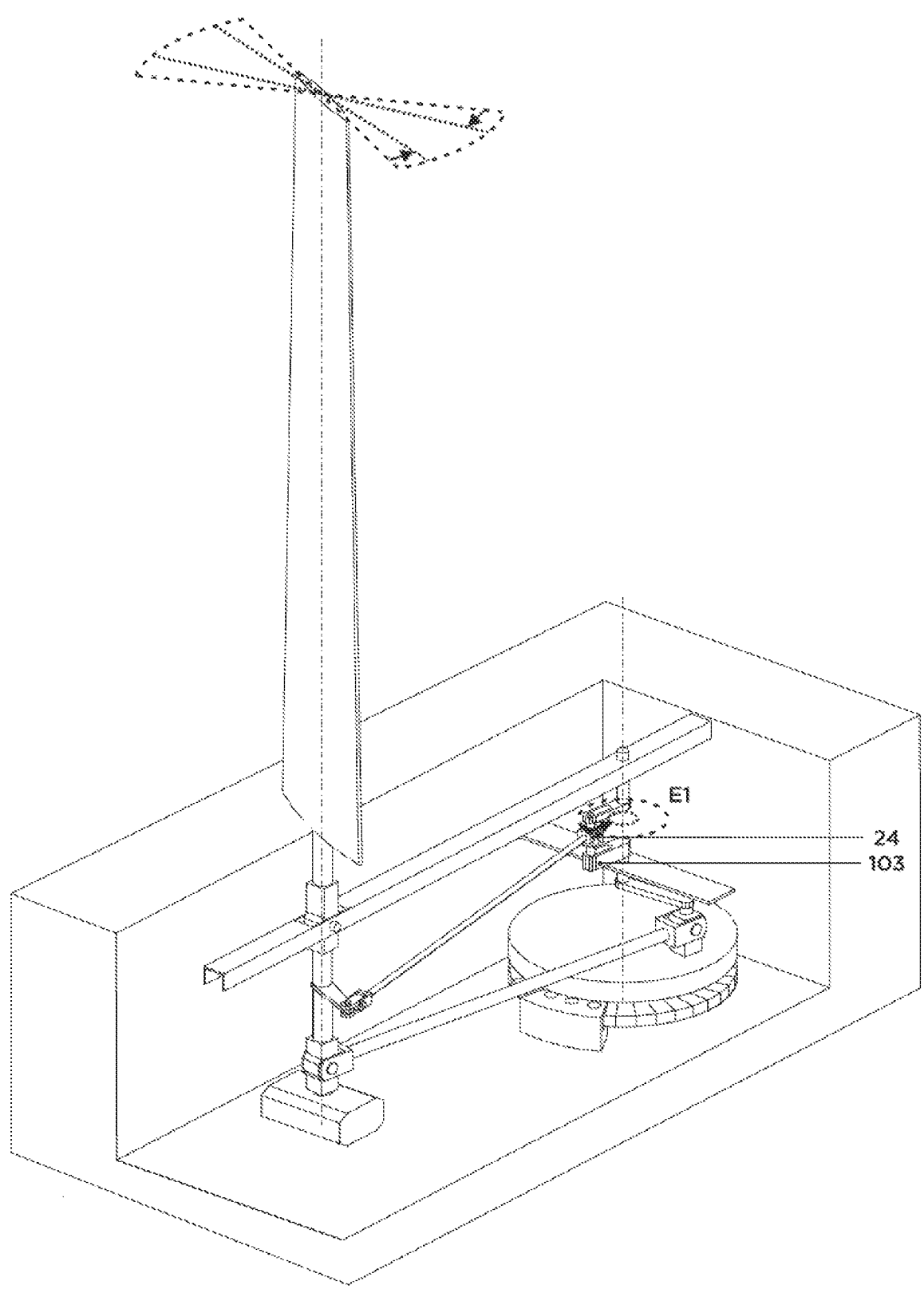
FIG. 4a illustrates the first mechanism for changing the amplitude of the blade's angle with respect to the fluid's flow rate.
Figure 4B:
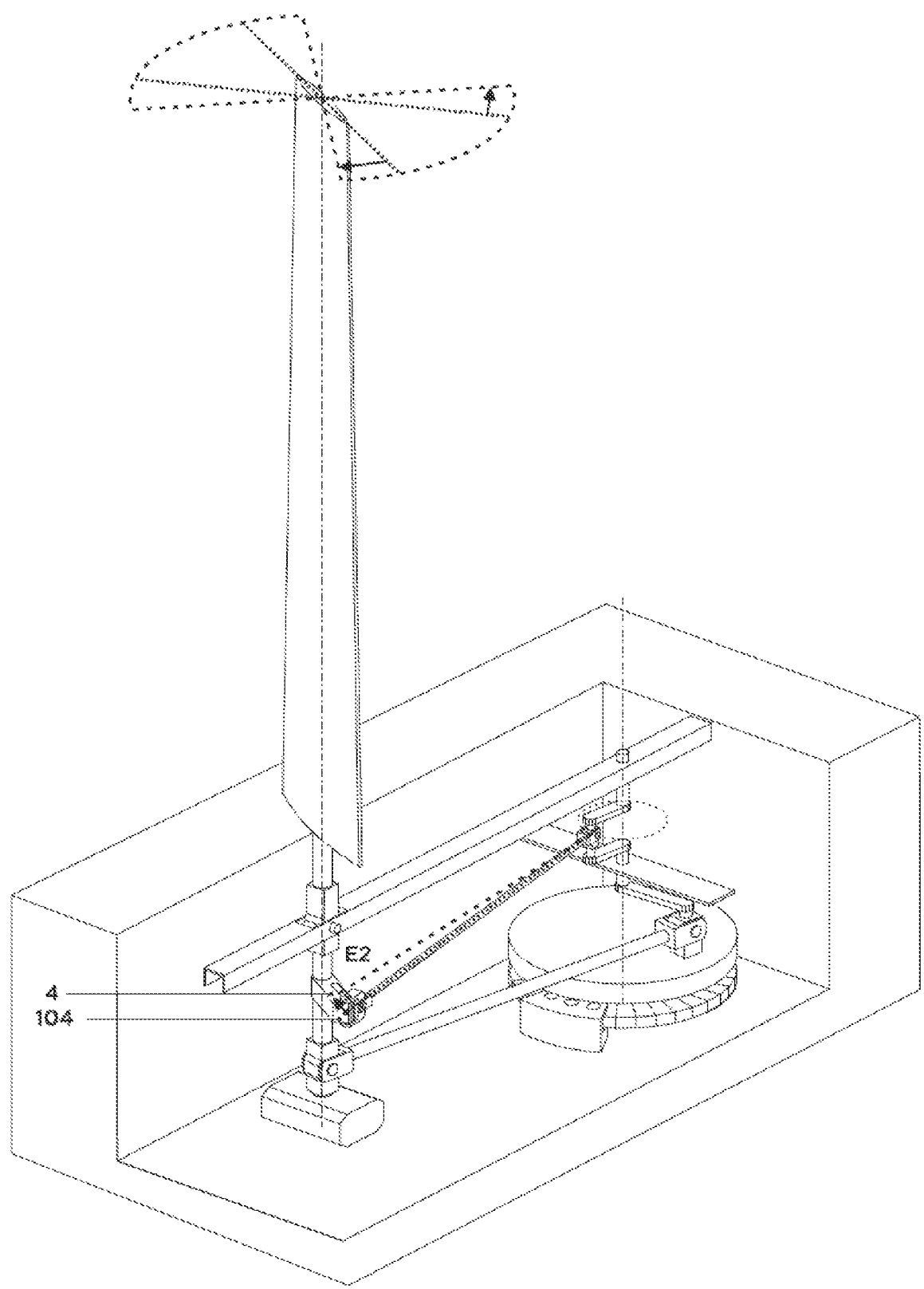
FIG. 4b illustrates the second mechanism for changing the amplitude of the blade's angle with respect to the fluid's flow rate.
Figure 4C:
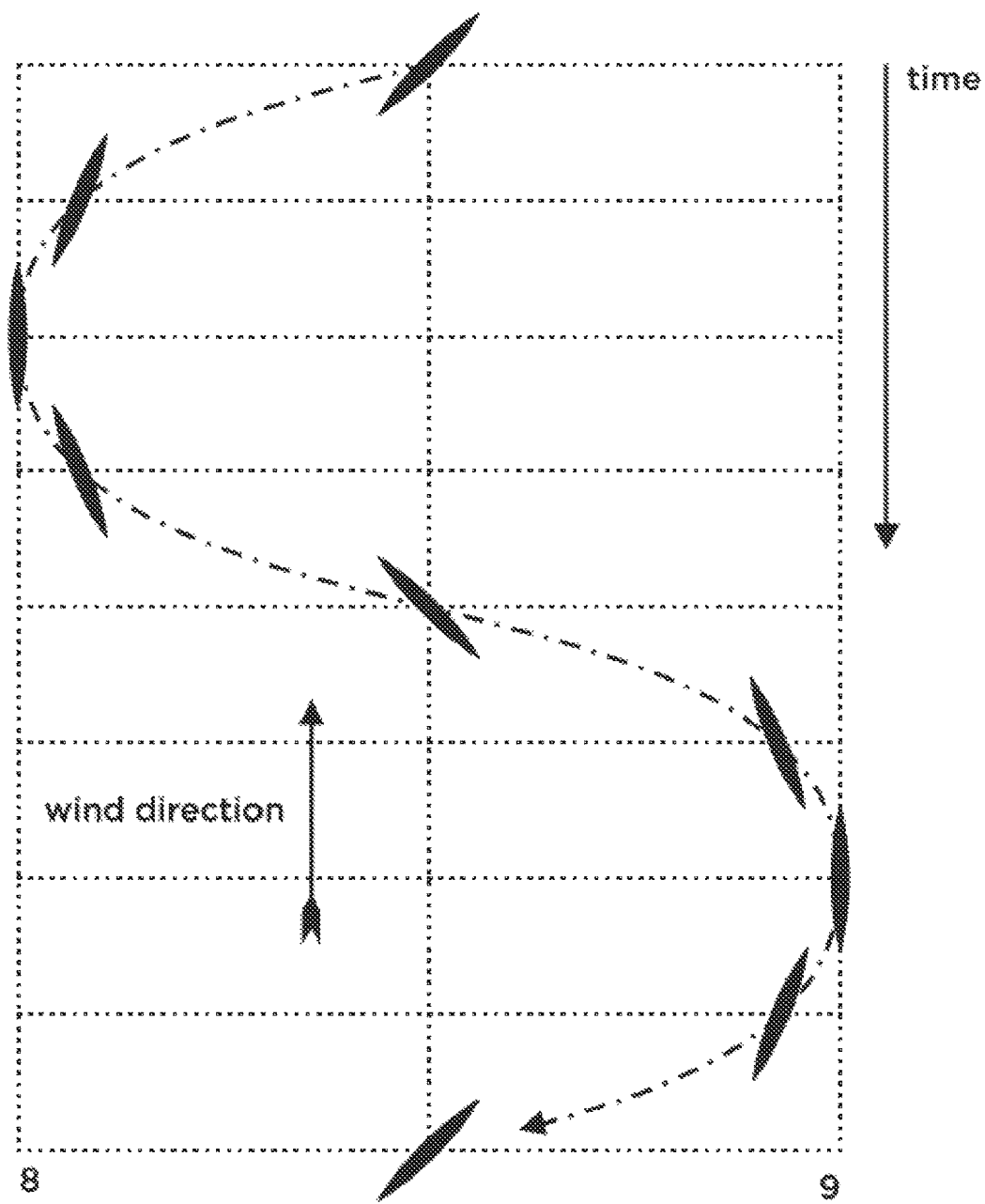
FIG. 4c shows the graph of decreasing the amplitude of the blade's angle.

This example of a specific embodiment of the present invention describes the construction of the apparatus for a more efficient way of generating power from fluid flows, as a modification to a wind turbine mounted below the ground level 26 as shown in FIGS. 1 and 2. The core of the structure is comprised of a pendular arrangement of a vertical blade 1 and a counterweight 5 pivotally mounted onto a pivot joint 3 with the axis 6 of oscillation and installed in static elements 16. In this case, the blade 1 is located above the counterweight 5 and the pivot joint 3 of the blade 1 is located above the center of gravity. The essence of the invention lies in the fact that the pivot joint 3 of the vertical blade 1 with a symmetrical aerodynamic profile and its axis 7 and the arm 2a of the blade 1 is coupled with the counterweight of a slightly higher weight than the blade 1 via the arm 2a of the counterweight 5, while the arm 2a of the counterweight 5 is coupled with the following control mechanisms. The first is the mechanism A with an incorporated flywheel 10 with its axis 17 of rotation, the first articulated mounting 21 with trajectory 18, the first rod 20 and the first pivot joint 22 to capture torque. The electric generator 12 is connected to the flywheel 10. A series of magnets 13 with varying polarities are mounted onto the perimeter of the disc of the electric generator. There are static coils 14 positioned in the magnetic field of these magnets 13. The second is the mechanism B mounted on the shaft 11 with a crank 15 with the contained second articulated mounting 24 with trajectory 19 the second rod 23 the second pivot joint 25 and the lever 4 for the angle of attack for smooth and periodic changes in the alpha angle between 0° and ±80° up to ±90° of the blade 1 over the entire oscillation from one outermost position 8 to the other outermost position 9 against the direction of the fluid's flow, as shown in the graph in FIG. 1c. The third is the mechanism C for the smooth rotation of the surface of the blade rotation boundaries to the direction of the fluid's flow containing a length-adjustable member that is placed in the second rod 23. The length-adjustable member is the fourth linear actuator 100, as shown in FIG. 2a and in the graph in FIG. 2b. The fourth is the mechanism D1 for changing the amplitude of the oscillation of the blade 1 with respect to the fluid's flow rate with the first linear actuator 101 attached to the first articulated mounting 21, as shown in FIG. 3a, or with the alternative fifth mechanism D2 for changing the amplitude of the oscillation of the blade 1 with respect to the fluid's flow rate with the second linear actuator 102 attached to the first pivot joint 22, as shown in FIG. 3b. The effects of the fourth and/or the fifth mechanism D1, D2 on changing the amplitude of the oscillation of the blade 1 from the vertical at the beta angle between 0° and ±60° up to ±90° to the flow rate of the fluid are shown in the graph in FIG. 3c. The sixth is the mechanism E1 for changing the amplitude of the blade's angle with respect to the fluid's flow rate with the third linear actuator 103 attached to the second articulated mounting 24, as shown in FIG. 4a, or with the alternative seventh mechanism E2 for changing the amplitude of the blade's angle with respect to the fluid's flow rate with the fifth linear actuator 104 attached to the lever 4 of the angle of attack, as shown in FIG. 4b. The effects of the sixth and/or the seventh mechanism E1, E2 on changing the amplitude of the blade's angle with respect to the fluid's flow rate are shown in the graph in FIG. 4c.

Example 3

This example of a specific embodiment of the present invention describes the applications of the apparatus for more efficient obtaining of mechanical work and/or generating power from wind. The structure is described in detail in Example 2. FIG. 1a illustrates a container-type application anchored to the ground, which is also suitable for placement on isolated islands with a small population. FIG. 1b illustrates a container-type application located/buried under the ground, which is suitable for placement in suburban locations on the outskirts of housing developments.

Example 4

Figure 5:
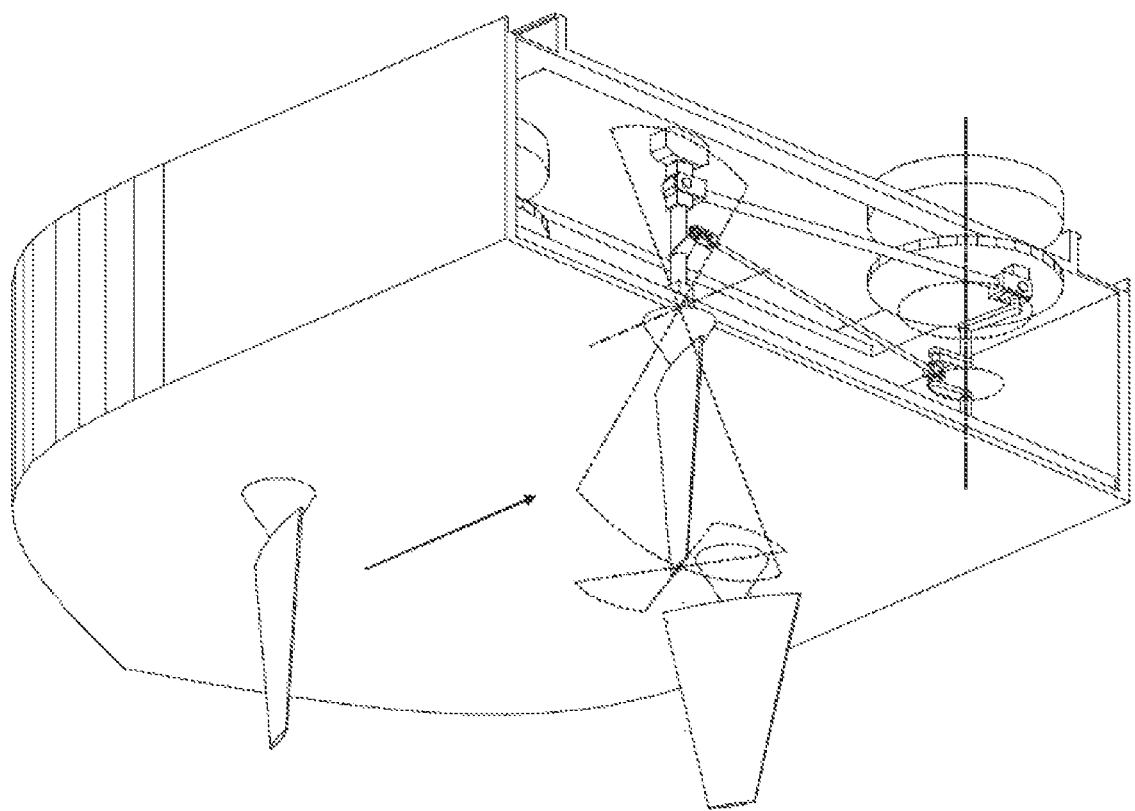
FIG. 5 illustrates a water turbine assembly for a boat arrangement.

This example of a specific embodiment of the present invention describes the construction of the apparatus for a more efficient way of generating power from flowing liquid (water), as a modification to a water turbine, as shown in FIG. 5. The core of the structure is comprised of a pendular arrangement of the vertical blade 1 and the counterweight 5 pivotally mounted onto the pivot joint 3, with the structure anchored to a boat or pontoon, as already described in Example 2. The difference of the structure lies in the fact that the blade 1 is located below the counterweight 5 and the pivot joint 3 of the blade 1 is located above the center of gravity, while the beta angle of the amplitude of the oscillation of the blade 1 to the vertical is a maximum of ±90° of the oscillation.

Example 5

Figure 6A:
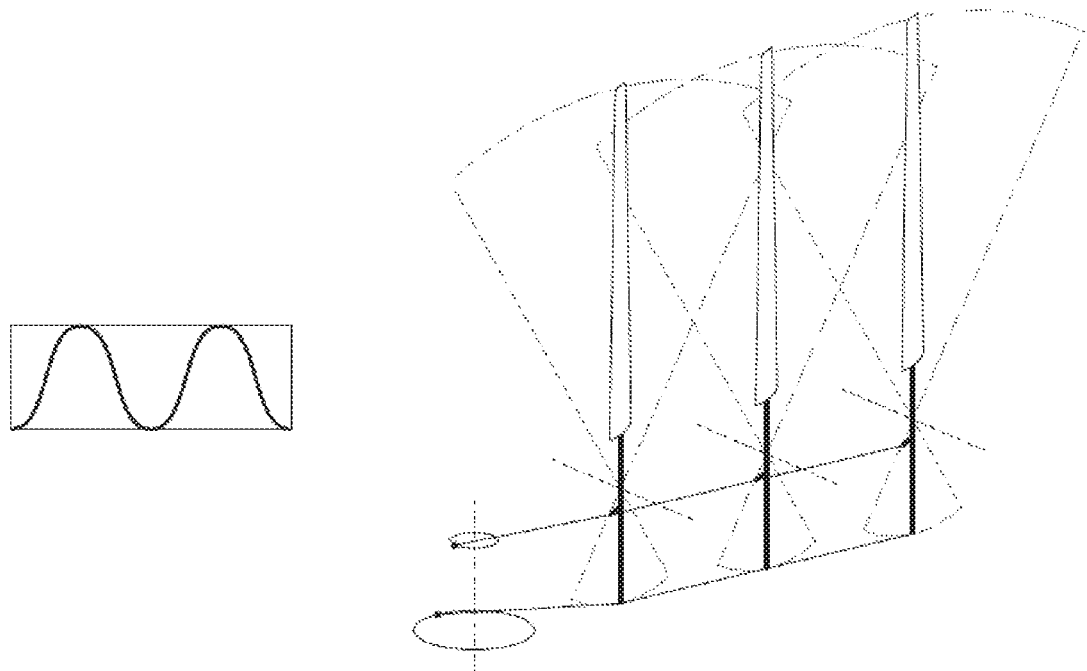
FIG. 6a illustrates the linear line-up of three wind turbines, for simplicity's sake drawn only coupled with mechanisms for capturing torque or tensile/compressive force and with mechanisms for smooth and periodic variations in the alpha angle of the blade, and a schematic performance characteristic per cycle.

This example of a specific embodiment of the present invention describes the applications of the apparatus for more efficient obtaining of mechanical work and/or generating power from wind for multiple line-ups. The structure of individual apparatuses is described in detail in Example 2. FIG. 6a illustrates the linear line-up of three wind turbines, for simplicity's sake drawn only coupled with mechanisms A for capturing torque or tensile/compressive force with one common crank and only coupled with mechanisms B for smooth and periodic variations in the alpha angle of the blade with one common crank. The attached scheme illustrates the performance characteristic per cycle reaching values from zero to two maximums.

Example 6

Figure 6B:
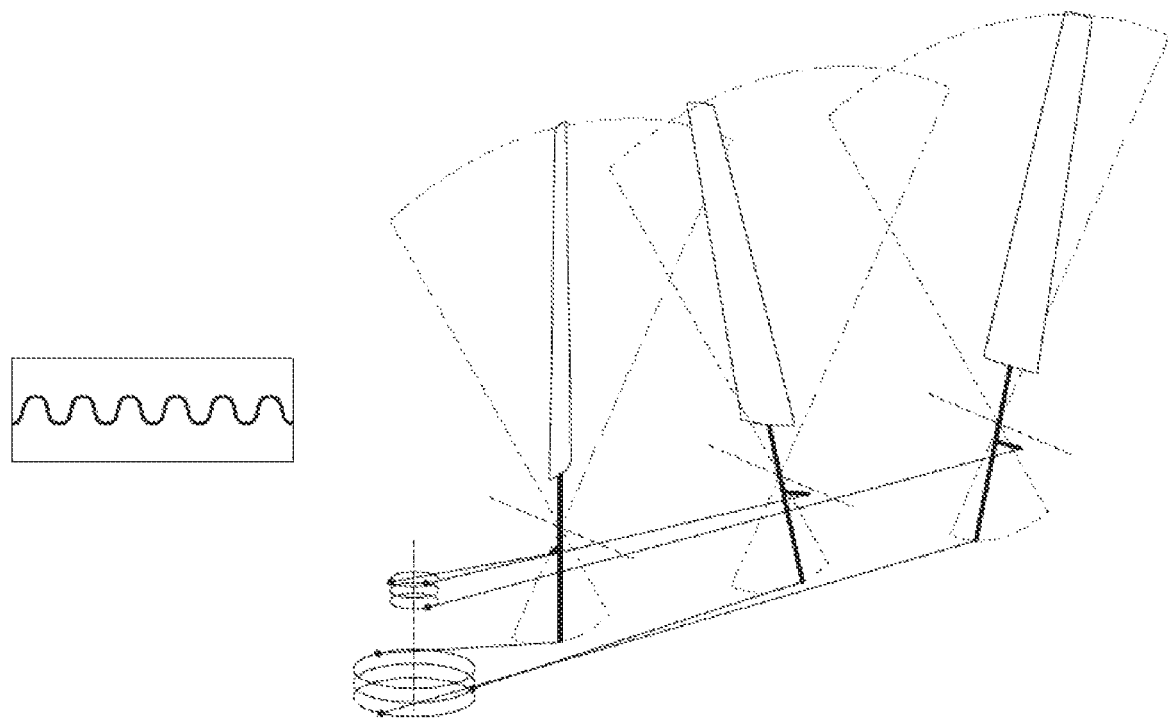
FIG. 6b illustrates the linear line-up of three wind turbines, for simplicity's sake drawn only with independent mechanisms for capturing torque or tensile/compressive force and with independent mechanisms for smooth and periodic variations in the alpha angle of the blade, and a schematic performance characteristic per cycle.

This example of a specific embodiment of the present invention describes the applications of the apparatus for more efficient obtaining of mechanical work and/or generating power from wind for multiple line-ups. The structure of individual apparatuses is described in detail in Example 2. FIG. 6b illustrates the linear line-up of three wind turbines, for simplicity's sake drawn only with independent mechanisms A for capturing torque or tensile/compressive force with three independent cranks and with independent mechanisms B for smooth and periodic variations in the alpha angle of the blade with three independent cranks. The attached scheme illustrates the performance characteristic per cycle reaching values with six minimums and six maximums.

Example 7

Figure 7A:
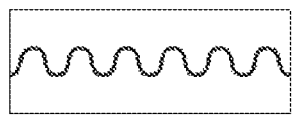
FIG. 7a illustrates the radial line-up of three wind turbines, for simplicity's sake drawn only coupled with mechanisms for capturing torque or tensile/compressive force and with mechanisms for smooth and periodic variations in the alpha angle of the blade, and a schematic performance characteristic per cycle.
Figure 7A:
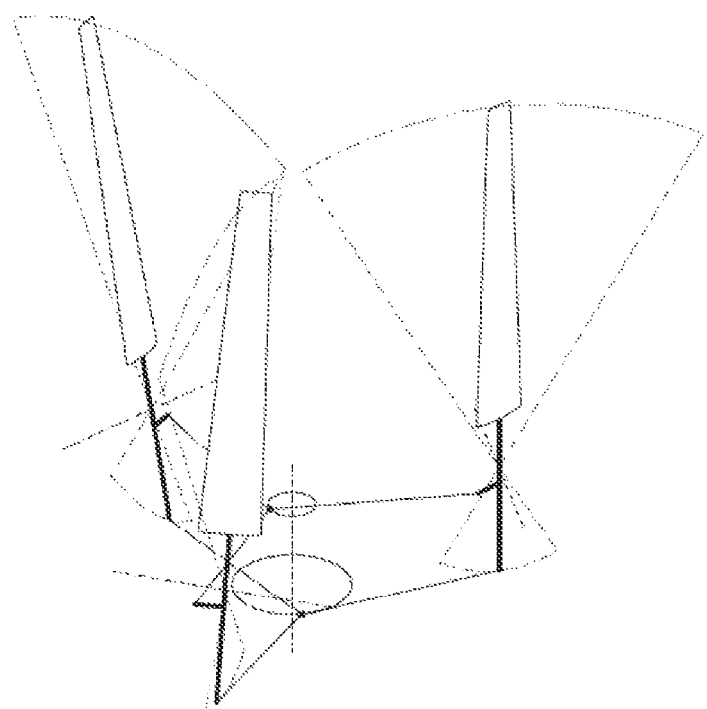

This example of a specific embodiment of the present invention describes the applications of the apparatus for more efficient obtaining of mechanical work and/or generating power from wind for multiple line-ups. The structure of individual apparatuses is described in detail in Example 2. FIG. 7a illustrates the radial line-up of three wind turbines, for simplicity's sake drawn only coupled with mechanisms A for capturing torque or tensile/compressive force with one common crank and coupled with mechanisms B for smooth and periodic variations in the alpha angle of the blade with one common crank. The attached scheme illustrates the performance characteristic per cycle reaching values with six minimums and six maximums.

Example 8

Figure 7B:
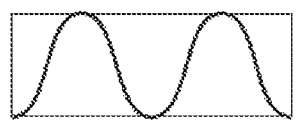
FIG. 7b illustrates the radial line-up of three wind turbines, for simplicity's sake drawn only with independent mechanisms for capturing torque or tensile/compressive force and with independent mechanisms for smooth and periodic variations in the alpha angle of the blade, and a schematic performance characteristic per cycle.
Figure 7B:
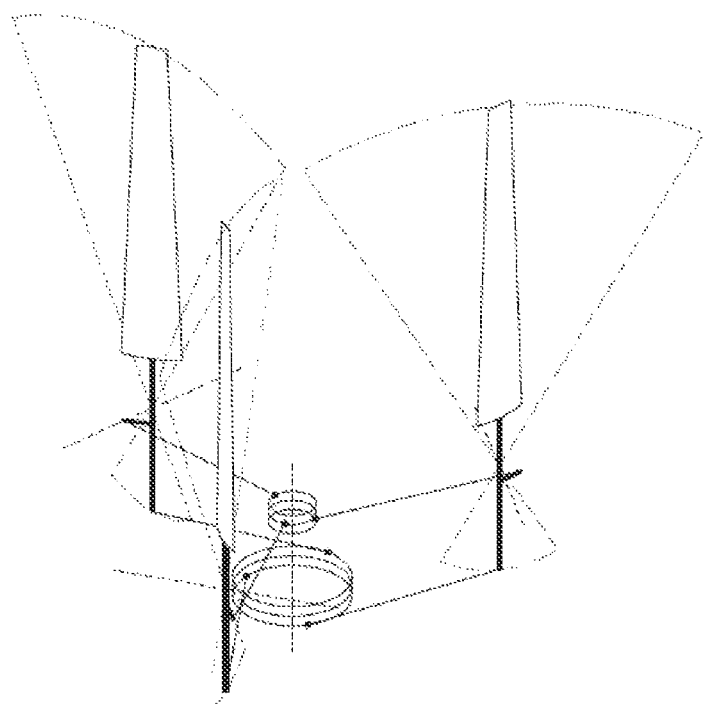

This example of a specific embodiment of the present invention describes the applications of the apparatus for more efficient obtaining of mechanical work and/or generating power from wind for multiple line-ups. The structure of individual apparatuses is described in detail in Example 2. FIG. 7b illustrates the radial line-up of three wind turbines, for simplicity's sake drawn only with independent mechanisms A for capturing torque or tensile/compressive force with three independent cranks and with independent mechanisms B for smooth and periodic variations in the alpha angle of the blade with three independent cranks. The attached scheme illustrates the performance characteristic per cycle reaching values from zero to two maximums.

Example 9

Figure 8A:
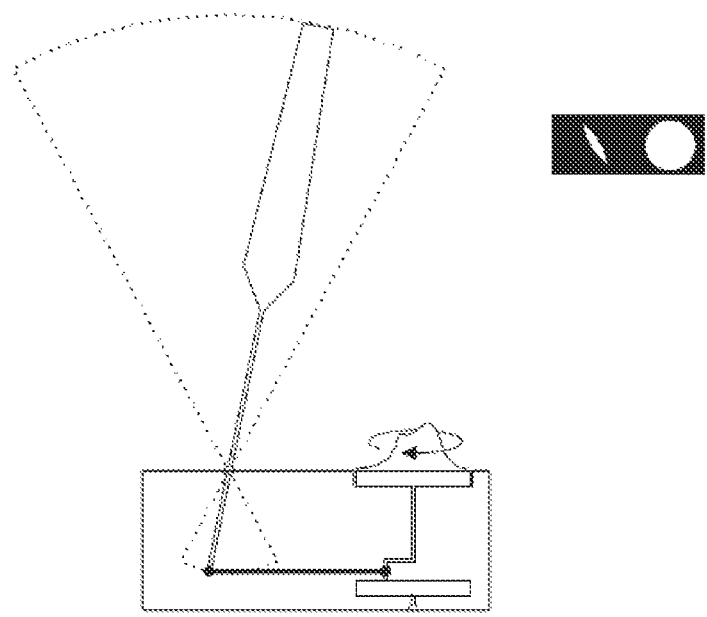
FIG. 8a shows the structural layout of a device for more efficient obtaining of mechanical work from airflow with a mechanism for capturing the torque to drive a carousel located in an amusement park.

This example of a specific embodiment of the present invention describes an application of the apparatus for more efficient obtaining of mechanical work from wind. The structure of the apparatus is described in detail in Example 2. FIG. 8a shows the structural layout of the device, for simplicity's sake drawn only with the mechanism A for capturing the torque to drive a carousel located in an amusement park.

Example 10

Figure 8B:
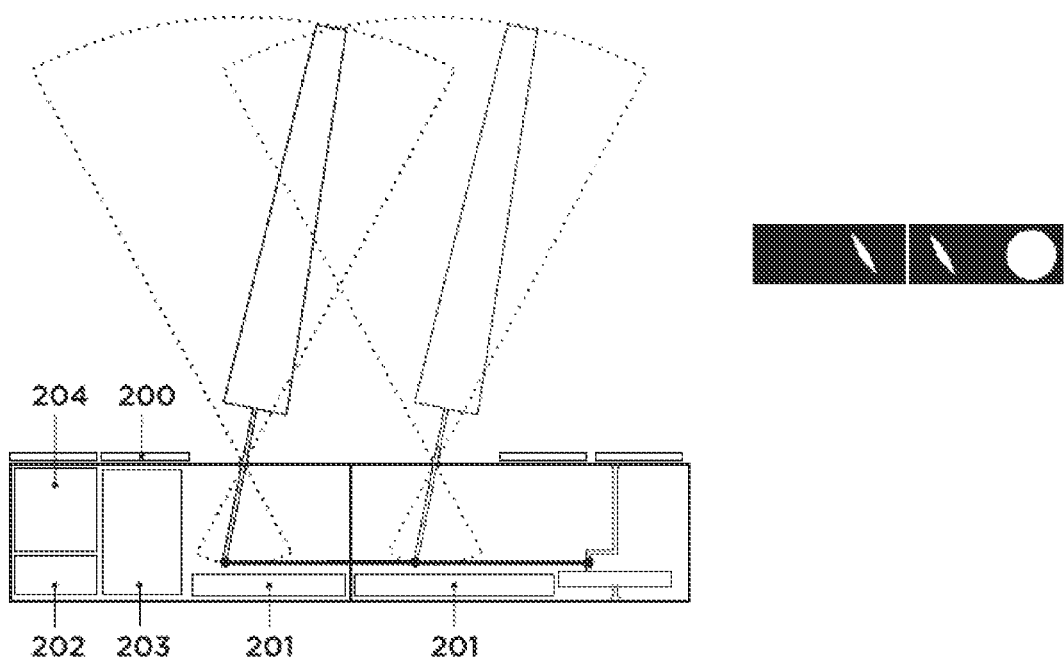
FIG. 8b shows the structural layout of a device for more efficient power generation for the needs of refugees in a humanitarian reception camp.

This example of a specific embodiment of the present invention describes an application of the apparatus for more efficient power generation from wind. The structure of the apparatus is described in detail in Example 2. FIG. 8b shows the structural layout of the device, for simplicity's sake drawn only with the mechanism A for the needs of refugees in a humanitarian refugee camp. It is basically an energy container that also contains associated photovoltaic systems 200 with batteries 201, a diesel engine 202 and storage systems with water 203 and a water treatment apparatus 204.

Example 11

Figure 9A:
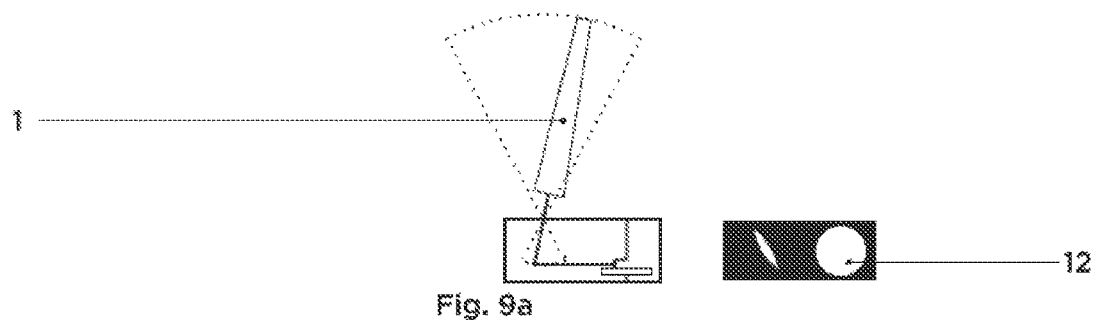
FIG. 9a shows the structural layout of a device for more efficient obtaining of mechanical work from airflow in the basic container embodiment.
Figure 9B:
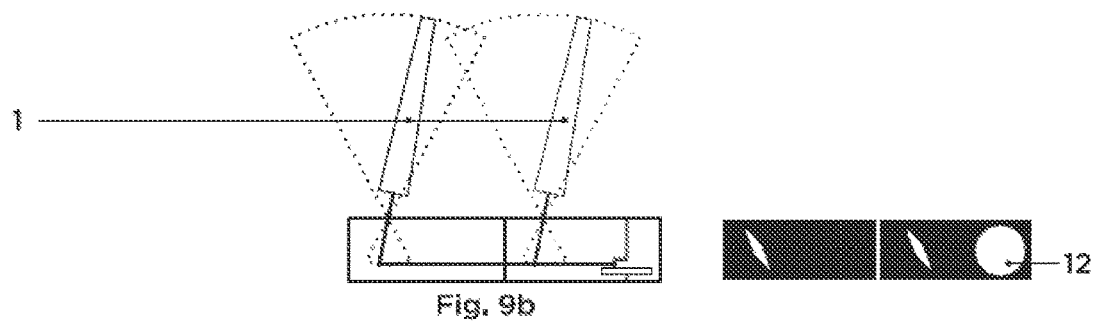
FIG. 9b shows the structural layout of a device for more efficient obtaining of mechanical work from airflow with one main container and one attached expansion container with a single blade in the linear line-up.
Figure 9C:
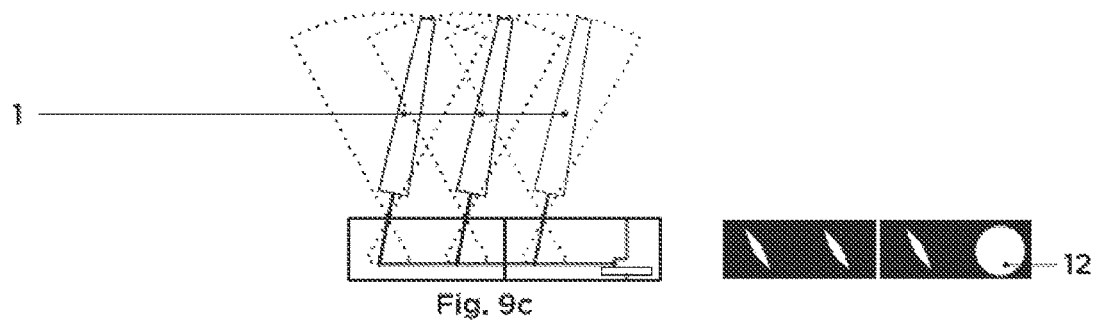
FIG. 9c shows the structural layout of a device for more efficient obtaining of mechanical work from airflow with one main container and one attached expansion container with two blades in the linear line-up.
Figure 9D:
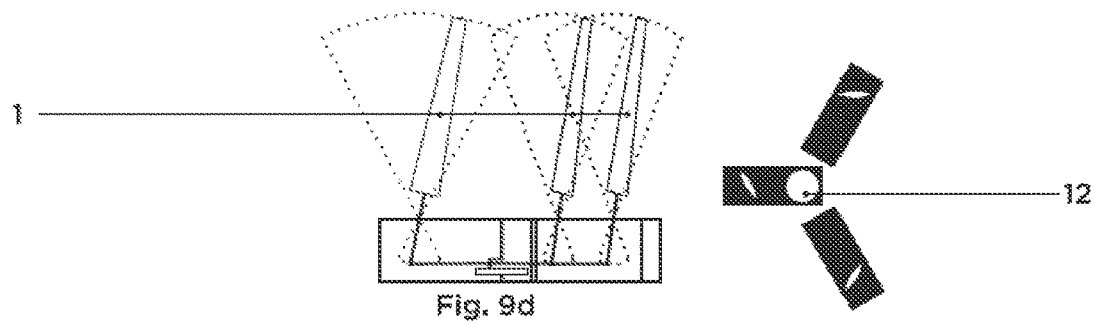
FIG. 9d shows the structural layout of a device for more efficient obtaining of mechanical work from airflow with one main container and two attached expansion containers with single blades in the radial line-up.
Figure 9E:
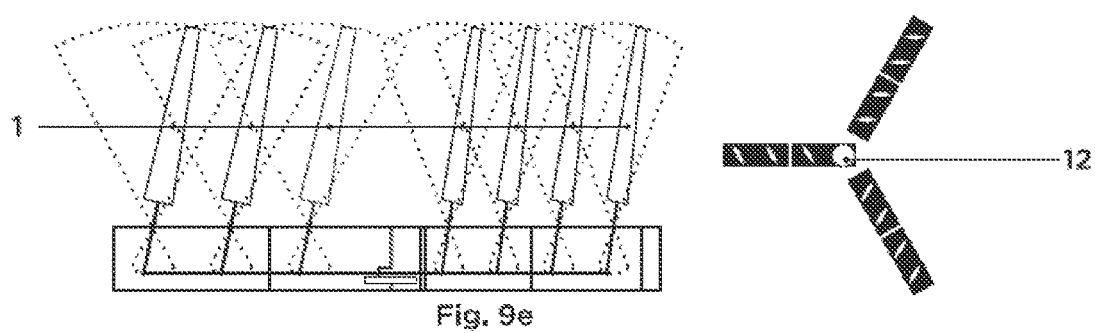
FIG. 9e shows the structural layout of a device for more efficient obtaining of mechanical work from airflow with one main container and five attached expansion containers with two blades each in the radial line-up.

This example of a specific embodiment of the present invention describes modular applications of the apparatus for more efficient obtaining of mechanical work and/or generating power from wind for multiple container line-ups. The structure of individual apparatuses is already described in detail in Example 2. FIG. 9a shows the structural layout of the device for more efficient obtaining of mechanical work from airflow in the basic container assembly with a single blade 1 and one electric generator 12. FIG. 9b shows the structural layout of the device for more efficient obtaining of mechanical work from airflow with one main container with a single blade 1 and one electric generator 12 and one attached expansion container with a single blade 1 in the linear line-up. FIG. 9c shows the structural layout of the device for more efficient obtaining of mechanical work from airflow with one main container with a single blade 1 and one electric generator 12 and one attached expansion container with two blades 1 in the linear line-up. FIG. 9d shows the structural layout of the device for more efficient obtaining of mechanical work from airflow with one main container with a single blade 1 and one electric generator 12 and two attached expansion containers with a single blade 1 each in the radial line-up. FIG. 9e shows the structural layout of the device for more efficient obtaining of mechanical work from airflow with one main container with a single blade 1 and one electric generator 12 and five attached expansion containers with two blades 1 each in the radial star line-up.

INDUSTRIAL APPLICABILITY

The more efficient way of obtaining mechanical work and/or generating power from fluid flows and corresponding apparatuses based on the invention can find their application especially in the power engineering industry, as well as a drive for pumps, winches, carousels, etc.

The invention claimed is:

1. An apparatus for obtaining mechanical work and/or generating power from fluid flows with increased effectiveness comprising:
    a vertical arrangement of a blade and a counterweight pivoting on a pivot joint, wherein the pivot joint (3) of the blade (1) is coupled with the counterweight (5) via an arm (2b) of the counterweight, wherein the arm (2b) of the counterweight is coupled with at least two mechanisms belonging to a system of control mechanisms comprising:
    a first mechanism (A) for taking torque or tensile/compressive force containing a first rod (20), a first pivot joint (22), a first articulated mounting (21) and a flywheel (10), wherein an electric generator is attached to the flywheel (10);
    the first mechanism (A) further comprising a mechanism (D1) for changing the amplitude of the oscillation of the blade with respect to the fluid's flow rate containing a first linear actuator (101) coupled to the first articulated mounting (21), and/or a mechanism (D2) for changing the amplitude of the oscillation of the blade with respect to the fluid's flow rate containing a second linear actuator (102) coupled to the first pivot joint (22);
    a second mechanism (B) for continuously and periodically changing an angle alpha of the blade in relation to direction of the flow of fluid in a range from 0° to max.±90° throughout an oscillation containing a second rod (23), a second pivot joint (25), an angle lever (4) and a second articulated mounting (24);
    the second mechanism (B) further comprising a mechanism (C) for continuously rotating a surface of the blade into a direction of the fluid's flow containing a length-adjustable member incorporated into the second rod (23);
    the second mechanism (B) further comprising a mechanism (E1) for changing the amplitude of the angle of the blade with respect to the fluid's flow velocity containing a third linear actuator (103) coupled to the second articulated mounting (24), and/or a mechanism (E2) for changing the amplitude of the angle of the blade with respect to the fluid's flow velocity containing a fifth linear actuator (104) coupled to the angle lever (4).

2. The apparatus according to claim 1, wherein the length-adjustable member is a fourth linear actuator (100).

3. The apparatus according to claim 1, wherein the blade (1) is located above the counterweight (5) and the pivot joint (3) of the blade (1) is located above the center of gravity, and wherein the angle beta of oscillation of the blade (1) in relation to the vertical is from 0° to max.±90° and the apparatus is in the form of a wind turbine.

4. The apparatus according to claim 1, wherein the pivot joint (3) of the blade (1) is located in the center of gravity, and wherein the angle beta of the oscillation of the blade (1) in relation to the horizontal is from 0° to max.±90° of the oscillation and the apparatus is in the form of a wind turbine.

5. The apparatus according to claim 1, wherein the blade (1) is a water turbine blade, wherein the blade (1) is located under the counterweight (5) and the pivot joint (3) of the blade (1) is located above the center of gravity, and wherein the angle beta of the oscillation of the blade (1) in relation to the vertical is from 0° to max.±90° and the apparatus is in the form of a water turbine.

6. The apparatus according to claim 1, wherein the pivot joint (3) of the blade (1), counterweight (5), flywheel (10), the first mechanism (A) and the second mechanism (B) are integrated in a container located on the surface or below the surface of the ground or mounted on a boat or in a building.

7. The apparatus according to claim 1, wherein the pivot joint (3) of the blade (1), counterweight (5) are installed integrated in an auxiliary container.

8. The apparatus according to claim 1, wherein the blade (1) comprises at least two blades (1) are arranged in a multiple linear line-up and at least two mechanisms (A) or at least two mechanisms (B) are coupled together or are mutually independent.

9. The apparatus according to claim 1, wherein the blade (1) comprises at least two blades (1) are arranged in a multiple radial line-up and at least two mechanisms (A) or two mechanisms (B) are coupled together or are mutually independent.

* * * * *